DAYS AT 50° C
MALEIC AND ANALOGS
2%. Aged at 50°C.

United States Patent Office 3,814,803
Patented June 4, 1974

3,814,803
STABILIZED PESTICIDAL COMPOSITIONS CONTAINING ALKYL DINITROPHENYL ESTERS
John H. Eckfeldt, Ambler, Pa., assignor to Rohm and Haas Company, Philadelphia, Pa.
Filed July 12, 1971, Ser. No. 161,451
Int. Cl. A01n 9/12, 9/20
U.S. Cl. 424—286     7 Claims

ABSTRACT OF THE DISCLOSURE

The hydrolysis of pesticidal alkyl dinitrophenyl esters, upon aging in formulated products, leading to the phytotoxic alkyl dinitrophenols, is controlled by incorporation into the pesticidal formulation of a stabilizer selected from one or more of maleic acid, maleic anhydride, itaconic anhydride, phthalic anhydride and crotonyl chloride, and citraconic anhydride.

---

This invention relates to a method for stabilization of alkyl dinitrophenyl esters exemplified by dinocap and other pesticides susceptible to hydrolysis, especially when combined into powdered formulations, including an admixture with metal salts of alkylene bis-dithiocarbamic acids. In another aspect, it relates to providing a storage stable combination fungicidemiticide.

An object of this invention is to maintain and increase the long term storability of such an ester alone, or in the presence of other decomposition activating pesticides or carriers.

A further object of the invention is to provide combination dithiocarbamate-dinocap mixtures which exhibit retention of their complementary pesticidal activities after aging.

A still further object is the preparation of dinocap-containing formulations which exhibit markedly lower phytotoxicity despite aging, than mixtures not including the adjuvants of this invention.

Another object of this is the preparation of stable pesticidal compositions containing alkyl dinitrophenyl esters as an active ingredient.

Dinocap (chemically the various isomers of dinitro-caprylphenylcrotonate) has been established worldwide for many years as an effective acaricide and limited spectrum fungicide. In recent years, it has been combined with the also well established metal salts (and their metal complexes) of ethylene bis-dithiocarbamic acids, which are widely known as broader spectrum fungicides.

In particular, mancozeb [zinc activated manganese ethylene bis-dithiocarbamate] has been recently and successfully combined with dinocap for use in apple orchards with marked commercial success. The mixture is marketed in the U.S. and certain foreign countries as a fungicidemiticide.

There is a possible problem suggested in the expanding commercial use of this combination pesticide. This involves the susceptibility of the dinocap component to hydrolysis into the corresponding ninitro capryl phenol. It can be hypothesized that the carbamate fungicide component, or a natural occurring decomposition product or same, may be a catalyst for this hydrolysis. The necessary moisture is usually available from ambient air humidity. In any event, the inclusion of an adjuvant that will insure the chemical stability of the dinocap component with aging is desirable. Thus, such a storage risk will be wholly obviated.

Other objects and advantages will become apparent to those skilled in the art without departing from the scope and spirit of this invention. Now follows a detailed description of the manner and process of making and using the invention, set forth in conjunction with the accompanying drawing in which.

Figure 1:
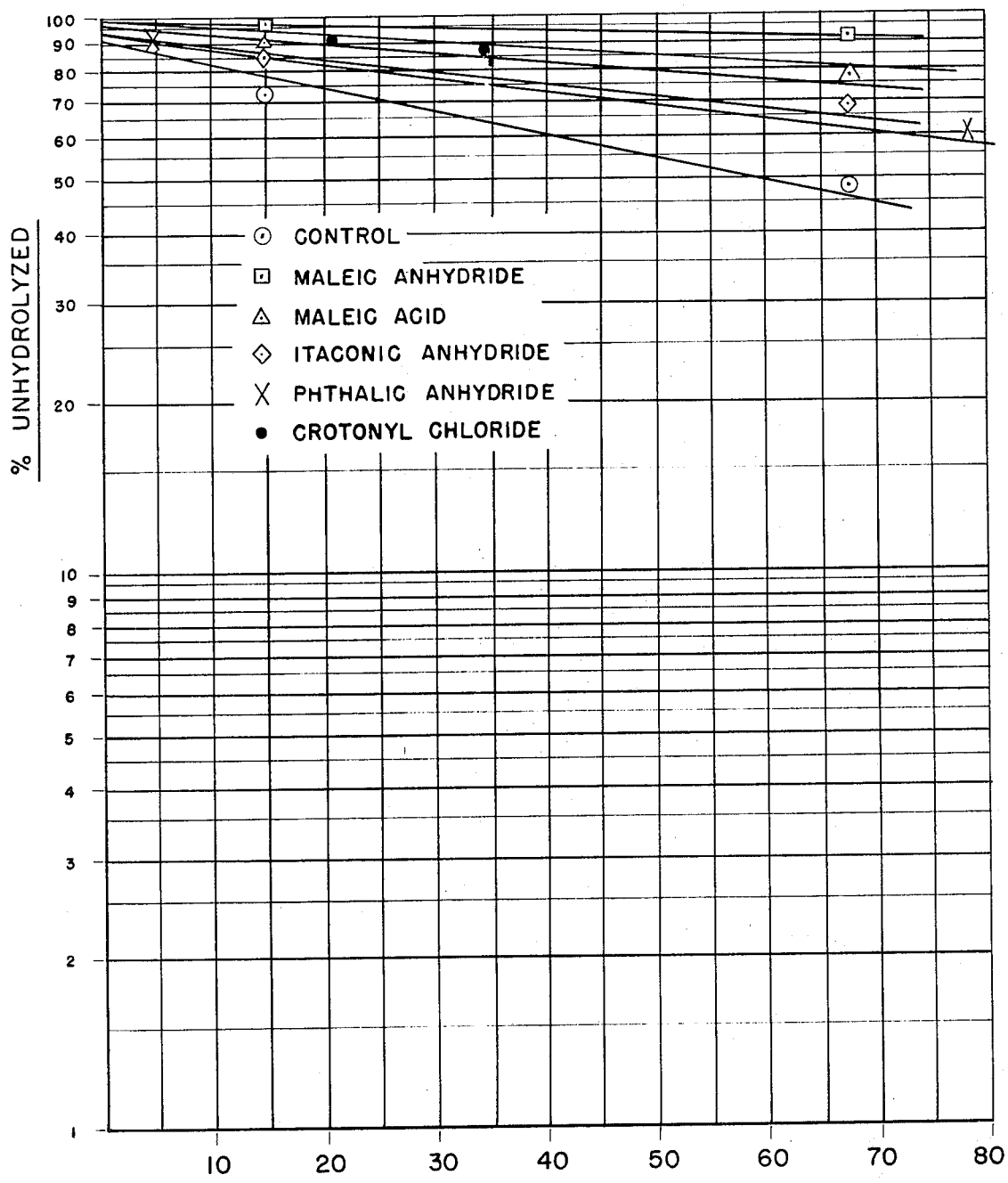
FIG. 1 is a plot on semi-logarithmic paper of the effect of selected stabilizers on the percent of hydrolysis of formulated dinocap.
Figure 2:
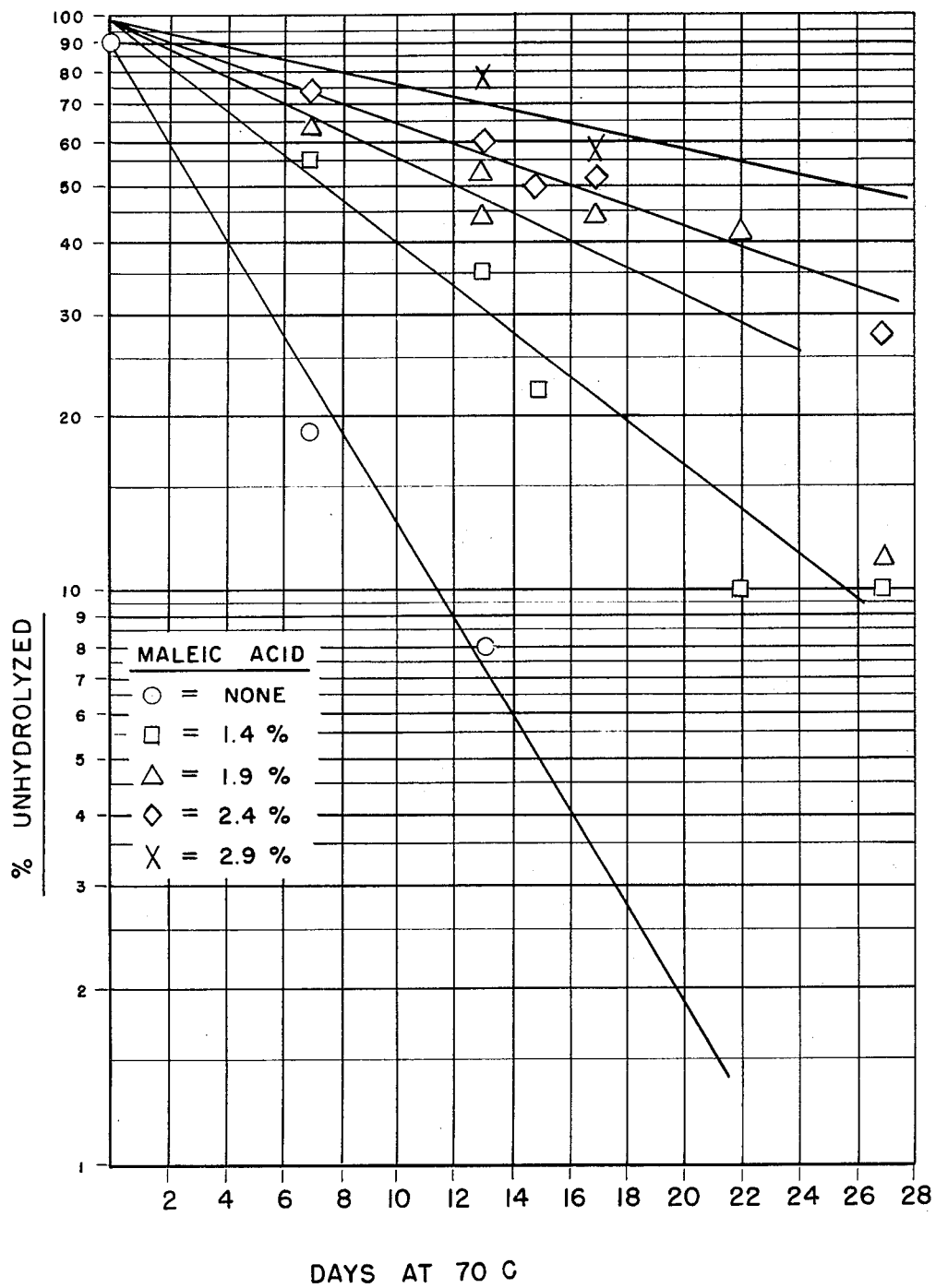
FIG. 2 is a plot on semi-logarithmic paper of the effect on percent hydrolysis of varying concentrations of the presently preferred maleic acid on the dinocap formulations.
Figure 3:
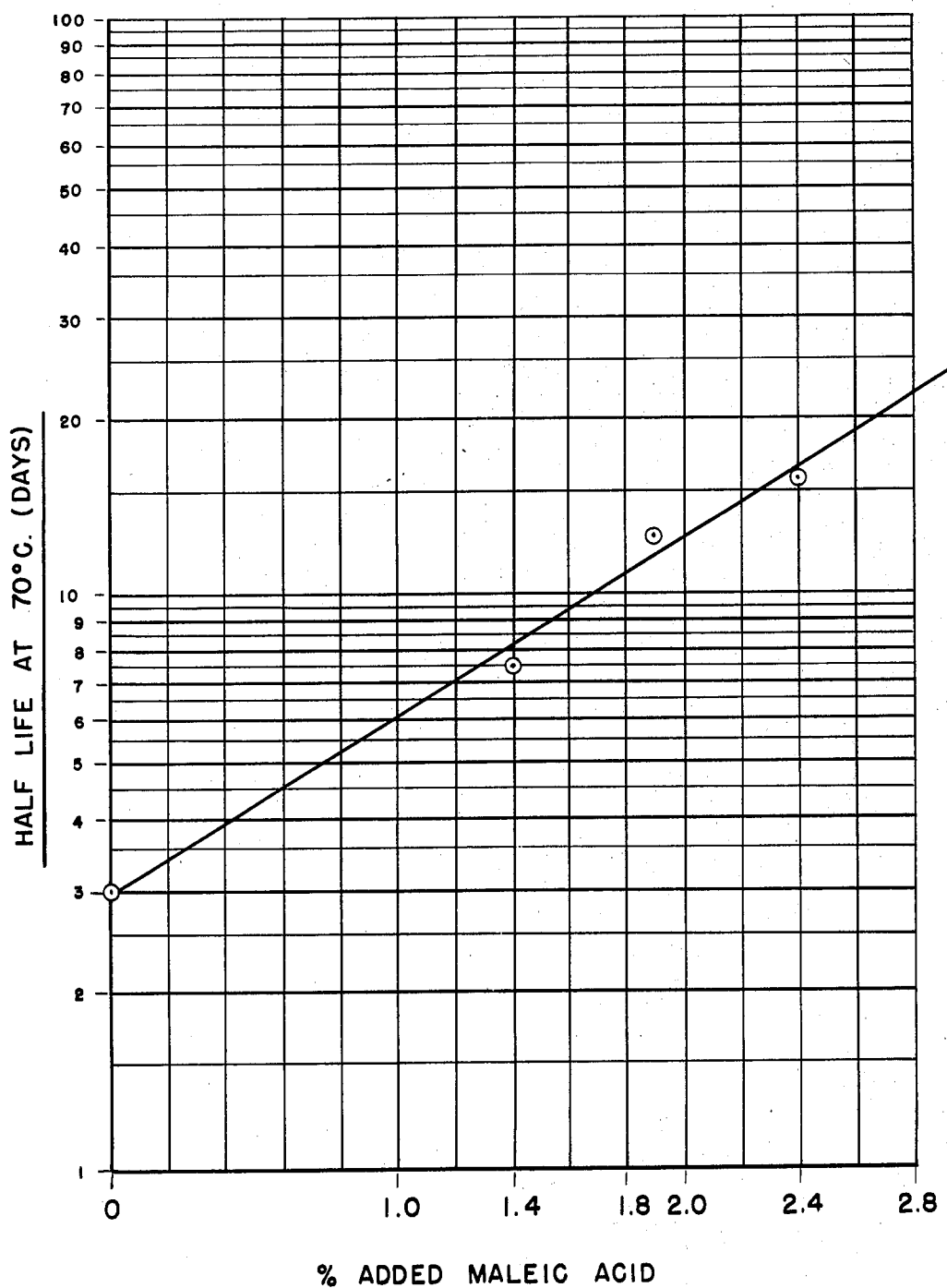
FIG. 3 is a plot on semi-logarithmic paper showing the time of 50 percent dinocap hydrolysis as a function of varying maleic acid concentration.

According to the present invention, there is taught a method for preserving unstable pesticide combinations, and providing novel pesticidal compositions resistant to decomposition upon aging, comprising a minor part of an alkyl dinitrophenyl ester which is susceptible to hydrolysis, often in the presence of a major part of a second pesticide component, such as a metal salt of an ethylene bis-dithiocarbamate or of an inert carrier, by incorporating in intimate admixture therewith, a stabilizing amount, ranging from 0.5 to 10.0 percent by weight of the final mixture, preferably from 1.0 to 5.0 percent of one or more of a reagent capable of delaying the hydrolysis of the first mentioned pesticide.

Other well known examples of alkyl dinitrophenyl ester class may be likewise benefited by the practice of this invention.

The alkyl dinitrophenyl esters include:

dinitro (capryl) phenyl crotonate (dinocap)
dinitro-sec-butyl phenyl-2-methyl crotonate
dinitro-sec-butyl phenyl isopropyl carbonate
dinitro (methyl heptyl) phenyl methyl carbonate The representative compositions of this invention typically comprise 85 to 94 parts by weight of the metal salt, 5 to 10 parts by weight of the crotonate, and 0.5 to 10 parts weight of said stabilizer.

In physical tests, the stabilized fungicide-miticides of this invention show essentially the same initial physical and biological properties as do the unstabilized compositions, when initially prepared. In some instances, these stabilized compositions have faster wetting out times. After aging, the stabilized materials are substantially less phytotoxic than the unmodified controls, due to the inhibition of hydrolysis customarily occurring in this period.

EXAMPLE I

Initial assay of candidate stabiilzers

In an evaporating dish there is mixed:

Technical Karathane (dinocap):* 6.4 g.
Surfactant:** 2.0 g.
Then there is included 2.4 g. of a stabiilzing additive. After this is well blended, then there is added in portions:

Dithane® M–45:*** 89.2 g.

The mixture is thoroughly blended with a spatula, and is then mixed for one minute in a Waring blendor.

Similar preparation with various candidate additives are prepared in a like manner.

The batches are split, placed in screw-cap jars, and aged at room temperatures and at 50° C. At intervals, ---
*Karathane is a technical grade of dinocap manufactured by Rohm and Haas Company.
**Suitable surfactants are nonionics of the octylphenol series, ethylene oxide adducts. For example, Triton X–45 (OPE–5) and Triton X–100 (OPE–9–10) and similar mixtures of surfactants known to those skilled in the art.
***A technical grade of mancozeb supplied by the Rohm and Haas Company, Philadelphia, Pa.

portions of the aged samples are withdrawn, extracted with acetone, and the extracts analyzed by gas liquid chromatography for dinitrocaprylphenols and the corresponding crotonates. From these data, percent hydrolysis is calculated.

Results for the samples aged at 50° C. are set forth in Table I:

TABLE I

| Days at 50° C. | Percent hydrolysis of dinocap | | | | |
|---|---|---|---|---|---|
| | 7 | 21 | 34 | 42 | 56 |
| Additive: | | | | | |
| Control (no additive) | 20 | 24 | N.T. | 51 | 49 |
| Maleic anhydride, 0.5% | 16 | N.T. | N.T. | 59 | N.T. |
| Maleic anhydride, 2.4% | 6 | 8 | N.T. | 12 | 9 |
| Control | 25 | N.T. | 52 | N.T. | 52 |
| Maleic anhydride, 2.4% | 12 | N.T. | 18 | N.T. | 18 |
| Control | N.T. | 31 | 37 | N.T. | |
| Crotonyl chloride, 2.4% | N.T. | 9 | 12 | N.T. | |
| Control | a 25 | N.T. | 52 | N.T. | |
| Maleic acid, 2.4% | a 12 | 27 | 18 | N.T. | | a Determined at six days.

NOTE: N.T.=Not Tested.

After 42 days at room temperature (25° C.) a control showed 16% hydrolysis and 2.4% maleic anhydride showed only 5% hydrolysis; while after 71 days the same samples gave 14% and 4%, respectively. After 69 days, another control gave 18%, 2.4% maleic acid gave 8%. After 46 days, a control showed 13% while 2.4% crotonyl chloride gave 4% hydrolysis.

EXAMPLE II

A series of combinations of dinocap and mancozeb were made up as follows. The dinocap and surfactant were blended, and the appropriate finely ground candidate stabilizer was dispersed in the blend. This dinocap pre-mix was then blended with the mancozeb in a Waring blender for one minute. The control formulation was as follows:

Mancozeb (Dithane® M–45) _____ 90.4
Dinocap (Karathane®) _____ 7.6
Surfactant _____ 2.0

In the test formulations, the indicated percentages of the mancozeb were replaced by one of the following:

maleic anhydride
maleic acid
itaconic anhydride
crotonyl chloride
phthalic anhydride All five formulations were sealed in glass bottles and held at 50° C. At intervals they were analyzed for free phenols and for crotonate esters, and the percent hydrolysis calculated. The results are listed in Table II. Since the hydrolysis may be expected to be a psuedo-first order reaction, the logarithm of the percent *unhydrolyzed* was plotted against days at 50° C., in FIG. I. The slopes of these lines show that maleic anhydride, maleic acid, phthalic anhydride, itaconic anhydride and crotonyl chloride significantly repress the hydrolysis of dinocap.

TABLE II

| Additive | Percent hydrolysis, 50° C. for— | |
|---|---|---|
| | 15 days | 68 days |
| None | 26 | 53 |
| Maleic anhydride (2.4 wt. percent) | 4 | 8 |
| Maleic acid (2.8 wt. percent) | 11 | 23 |
| Itaconic anhydride (2.4 wt. percent) | 13 | 31 |
| Crotonyl chloride (2.4 wt. percent) | a 9 | b 12 |
| Phthalic anhydride (3.6 wt. percent) | c 10 | d 40 | a Determined at 21 days.
b Determined at 30 days.
c Determined at 9 days.
d Determined at 79 days.

EXAMPLE III

Similar formulations were prepared in which the amount of added maleic acid was 0, 1.4, 1.9, 2.4 and 2.9 parts per 100 of formulation. The formulations were placed in sealed bottles and exposed at 70° C., and the percent hydrolysis determined at intervals. The results are shown graphically in FIG. II. From FIG. II, the $t\frac{1}{2}$, or time when 50% of the dinocap was hydrolyzed, was estimated for each level. The logarithm of $t\frac{1}{2}$ was plotted against percent maleic acid in FIG. III. It is obvious that the degree of stabilization is directly dependent on the amount of added maleic acid. Note that 0.5% will increase half life by >33%. A level of 10% constitutes a practical upper level, on the basis of cost and minimizing undue dilution of the formulation.

Though generally a single stabilizer component is conveniently employed, they may be used in combination within the given range, as best optimized by routine testing.

EXAMPLE V

To study the use of maleic acid and anhydride with dinocap substrates other than mancozeb, a series of dinocap wettable powders were prepared, based on the following formula:

Technical Karathane _____ 26.0
Triton® GR–5 a _____ 5.0
Dispersant b _____ 3.0
Diluex c _____ 33.0
Zeolex 23 d _____ 33.0 a The surfactant, dioctyl sodium sulfosuccinate, supplied by Rohm and Haas Company, Phila.
b Sodium salt of the copolymer of maleic acid and diisobutylene.
c A finely divided grayish-white powder from the mineral floriden, supplied by the Floridin Company.
d A white reinforcing pigment, manufactured by J. M. Huber Corporation.

Diluex and Zeolex 23 are well-known extenders for pesticides. Portions of the extenders were replaced by maleic acid or maleic anhydride, as indicated. All samples are sealed in jars, heated at 70° C. for 15 days, and analyzed for percent hydrolyzed. The results are reported in Table III below:

TABLE III

| Maleic: | Percent hyd. |
|---|---|
| None | 64 |
| 1.0% anhydride | 40 |
| 1.5% anhydride | 42 |
| 2.0% anhydride | 38 |
| 1.4% acid | 42 |
| 1.9% acid | 35 |
| 2.4% acid | 29 |

The data of Table III demonstrates that the disclosed pesticide stabilizers do stabilize dinocap when formulated in admixture with representative extenders.

EXAMPLE V

Another metal salt of an alkylene bis-dithiocarbamic acid, namely zineb * was utilized as a dinocap substrate, it being substituted for mancozeb in the procedure of Example II. The resulting stability data are as follows in Table IV.

TABLE IV.—PERCENT DINOCAP HYDROLYZED

| Percent maleic acid | Initial | 1 day, 70° C. | 5 days, 70° C. | 5 days, 50° C. |
|---|---|---|---|---|
| 0 | 10 | 68 | | 68 |
| 2.0 | 7 | | 88 | 16 |

The data shows that dinocap is much more susceptible to hydrolysis on zineb than on mancozeb, in the absence of any stabilizer. The inclusion of just 2 percent maleic acid afforded a startling improvement in stability at the lower temperature.

*Zinc ethylene bis-dithiocarbamate.

EXAMPLE VI

Similar formulations were prepared in which the stabilizer was 2% or 3% of citraconic anhydride (methylmaleic anhydride). The formulations were exposed at 70° C. for 6 days and analyzed. The 2% formulation showed 42% hydrolysis and the 3% formulation only 35% hydrolysis. Comparing these data to those in FIG. II, it is evident that citraconic anhydride is an effective stabilizer.

I claim:

1. A stabilized fungicidal and acaricidal composition comprising 85 to 94 parts by weight of a fungicidal and acaricidal ethylenebisdithiocarbamic acid salt selected from the group consisting of zinc ethylenebisdithiocarbamate and zinc-activated manganese ethylenebisdithiocarbamate, 5 to 10 parts by weight of a fungicidal and acaricidal alkyldinitrophenyl ester selected from the group consisting of dinitro-capryl-phenyl crotonate,
dinitro-sec-butyl-phenyl 2-methyl-crotonate,
dinitro-sec-butyl-phenyl isopropyl carbonate, and
dinitro-(methyl-heptyl)-phenyl methyl carbonate and 0.5 to 10 parts by weight of a stabilizer selected from the group consisting of maleic acid, maleic anhydride, itaconic anhydride, phthalic anhydride, crotonyl chloride and citraconic anhydride.

2. The composition of claim 1 wherein the ester is dinitrocaprylphenyl crotonate.

3. The composition of claim 1 wherein the salt is zinc ethylenebisdithiocarbamate.

4. The composition of claim 1 wherein the salt is zinc-activated manganese ethylenebisdithiocarbamate.

5. The composition of claim 1 wherein the stabilizer is maleic acid.

6. The composition of claim 2 wherein the salt is zinc-activated manganese ethylenebisdithiocarbamate.

7. The composition of claim 6 wherein the stabilizer is maleic acid.

References Cited

UNITED STATES PATENTS

| | | | |
|---|---|---|---|
| 3,379,610 | 4/1968 | Lyon et al. | 424—284 |
| 2,861,915 | 11/1958 | Cary | 424—314 |
| 2,526,660 | 10/1950 | Hester et al. | 260—479 |

ALBERT T. MEYERS, Primary Examiner

L. SCHENKMAN, Assistant Examiner

U.S. Cl. X.R.

424—289, 301, 314, 317